(12) United States Patent
Potts et al.

(10) Patent No.: US 10,909,808 B2
(45) Date of Patent: Feb. 2, 2021

(54) SYSTEM AND METHOD FOR CHECKLESS CASH ADVANCE SETTLEMENT

(71) Applicant: Everi Payments Inc., Austin, TX (US)

(72) Inventors: Craig Potts, Scottsdale, AZ (US); Richard Beer, Prior Lake, MN (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

(21) Appl. No.: 16/727,451

(22) Filed: Dec. 26, 2019

(65) Prior Publication Data

US 2020/0211329 A1  Jul. 2, 2020

Related U.S. Application Data

(63) Continuation of application No. 15/954,404, filed on Apr. 16, 2018, now Pat. No. 10,535,226, which is a (Continued)

(51) Int. Cl.
*G07F 17/32* (2006.01)
*A63F 3/00* (2006.01)
(Continued)

(52) U.S. Cl.
CPC ...... *G07F 17/3246* (2013.01); *A63F 3/00157* (2013.01); *G06Q 20/04* (2013.01);
(Continued)

(58) Field of Classification Search
CPC ...... G07F 17/32; G07F 19/20; G07F 17/3244; G07F 17/3239; G07F 17/3255;
(Continued)

(56) References Cited

U.S. PATENT DOCUMENTS 4,390,968 A   6/1983   Hennessy et al.
4,567,358 A   1/1986   Takamatsu et al.
(Continued)

FOREIGN PATENT DOCUMENTS

EP   1107196   6/2001
GB   2380687   4/2003
(Continued)

OTHER PUBLICATIONS

"AAMVA National Standard for the Driver License/Identification Card-AAMVA DL/ID-2000", American Association of Motor Vehicle Administrators (AAMVA). (c) 2000 AAMVA/AAMVAnet, 104 pages.
(Continued)

*Primary Examiner* — Thien M Le
*Assistant Examiner* — Tae W Kim
(74) *Attorney, Agent, or Firm* — Weide & Miller, Ltd.

(57) ABSTRACT

Methods, devices, and systems for conducting a checkless cash access settlement are provided. In one embodiment, a cash advance method includes the following: a customer initiates a cash access transaction via a cash access system; the customer receives authorization or denial; the customer provides identification and the financial card to a cashier or attendant; the cashier or attendant validates the customer's identity, retrieves the transaction information, and completes the cash advance application; the application prints a non-negotiable instrument, such as a transaction receipt; the customer signs the receipt confirming the transaction with a physical receipt or electronic capture.

20 Claims, 12 Drawing Sheets

Related U.S. Application Data continuation of application No. 14/969,916, filed on Dec. 15, 2015, now Pat. No. 9,959,585, which is a continuation of application No. 14/231,029, filed on Mar. 31, 2014, now Pat. No. 9,224,143, which is a continuation of application No. 13/245,516, filed on Sep. 26, 2011, now Pat. No. 9,171,303, which is a continuation of application No. 12/268,857, filed on Nov. 11, 2008, now Pat. No. 8,025,216, which is a continuation of application No. 11/223,708, filed on Sep. 9, 2005, now Pat. No. 7,461,780.

(60) Provisional application No. 60/608,196, filed on Sep. 9, 2004.

(51) Int. Cl.
*G07F 17/42* (2006.01)
*G07F 19/00* (2006.01)
*G06Q 20/04* (2012.01)
*G06Q 20/06* (2012.01)
*G07F 7/08* (2006.01)
*G06Q 20/40* (2012.01)
*G06Q 20/24* (2012.01)
*G06Q 50/34* (2012.01)
*G06Q 20/08* (2012.01)
*G06Q 20/18* (2012.01)

(52) U.S. Cl.
CPC ......... *G06Q 20/042* (2013.01); *G06Q 20/045* (2013.01); *G06Q 20/06* (2013.01); *G06Q 20/085* (2013.01); *G06Q 20/18* (2013.01); *G06Q 20/24* (2013.01); *G06Q 20/40* (2013.01); *G06Q 50/34* (2013.01); *G07F 7/08* (2013.01); *G07F 17/3223* (2013.01); *G07F 17/3225* (2013.01); *G07F 17/3237* (2013.01); *G07F 17/3239* (2013.01); *G07F 17/3241* (2013.01); *G07F 17/3244* (2013.01); *G07F 17/3248* (2013.01); *G07F 17/3251* (2013.01); *G07F 17/3255* (2013.01); *G07F 17/3286* (2013.01); *G07F 17/42* (2013.01); *G07F 19/00* (2013.01); *G07F 19/20* (2013.01)

(58) Field of Classification Search
CPC .. G07F 19/202; G07F 17/3223; G07F 19/201; G07F 7/04; G06Q 20/04; G06Q 20/10; G06Q 20/1085; G06Q 20/042; G06Q 40/02; G06Q 20/108; G06Q 20/18; G06Q 20/28; G06Q 20/40; G06Q 20/06; G06Q 20/14; G06Q 20/204; G06Q 20/382
USPC ........................................................ 235/379
See application file for complete search history.

(56) References Cited

U.S. PATENT DOCUMENTS

| | | |
|---|---|---|
| 4,689,742 A | 8/1987 | Troy et al. |
| 4,764,666 A | 8/1988 | Bergeron |
| 4,882,473 A | 11/1989 | Bergeron et al. |
| 5,025,373 A | 6/1991 | Keyser, Jr. et al. |
| 5,038,022 A | 8/1991 | Lucero |
| 5,157,717 A | 10/1992 | Hitchcock |
| 5,179,517 A | 1/1993 | Sarbin et al. |
| 5,223,699 A | 6/1993 | Flynn et al. |
| 5,265,874 A | 11/1993 | Dickinson et al. |
| 5,285,382 A | 2/1994 | Muehlberger et al. |
| 5,321,241 A | 6/1994 | Craine |
| 5,326,960 A | 7/1994 | Tannenbaum |
| 5,350,906 A | 9/1994 | Brody et al. |
| 5,386,104 A | 1/1995 | Sime |
| 5,429,361 A | 7/1995 | Raven et al. |
| 5,457,306 A | 10/1995 | Lucero |
| 5,470,079 A | 11/1995 | LeStrange et al. |
| 5,477,038 A | 12/1995 | Levine et al. |
| 5,613,912 A | 3/1997 | Slater |
| 5,642,160 A | 6/1997 | Bennett |
| 5,663,546 A | 9/1997 | Cucinotta et al. |
| 5,668,897 A | 9/1997 | Stolfo |
| 5,679,938 A | 10/1997 | Templeton et al. |
| 5,741,183 A | 4/1998 | Acres et al. |
| 5,754,655 A | 5/1998 | Hughes et al. |
| 5,766,075 A | 6/1998 | Cook et al. |
| 5,770,533 A | 6/1998 | Franchi |
| 5,813,912 A | 9/1998 | Shultz |
| 5,864,623 A | 1/1999 | Messina et al. |
| 5,897,625 A | 4/1999 | Gustin et al. |
| 5,902,983 A | 5/1999 | Crevelt et al. |
| 5,916,024 A | 6/1999 | Von Kohorn |
| 5,919,091 A | 7/1999 | Bell et al. |
| 5,959,277 A | 9/1999 | Lucero |
| 5,987,132 A | 11/1999 | Rowney |
| 5,991,410 A | 11/1999 | Albert et al. |
| 5,999,624 A | 12/1999 | Hopkins |
| 6,001,016 A | 12/1999 | Walker et al. |
| 6,038,553 A | 3/2000 | Hyde, Jr. |
| 6,044,360 A | 3/2000 | Picciallo |
| 6,045,039 A | 4/2000 | Stinson et al. |
| 6,048,269 A | 4/2000 | Burns et al. |
| 6,048,271 A | 4/2000 | Barcelou |
| 6,064,987 A | 5/2000 | Walker et al. |
| 6,081,792 A | 6/2000 | Cucinotta et al. |
| 6,124,947 A | 9/2000 | Seo |
| 6,162,122 A | 12/2000 | Acres et al. |
| 6,164,528 A | 12/2000 | Hills et al. |
| 6,168,522 B1 | 1/2001 | Walker et al. |
| 6,244,958 B1 | 6/2001 | Acres |
| 6,275,991 B1 | 8/2001 | Erlin |
| 6,293,866 B1 | 9/2001 | Walker et al. |
| 6,302,793 B1 | 10/2001 | Fertitta, III et al. |
| 6,347,738 B1 | 2/2002 | Crevelt et al. |
| 6,352,205 B1 | 3/2002 | Mullins et al. |
| 6,361,437 B1 | 3/2002 | Walker et al. |
| 6,409,595 B1 | 6/2002 | Uihlein et al. |
| 6,431,983 B2 | 8/2002 | Acres |
| RE37,885 E | 10/2002 | Acres et al. |
| 6,486,768 B1 | 11/2002 | French |
| 6,487,284 B1 | 11/2002 | Campbell |
| 6,505,772 B1 | 1/2003 | Mollett et al. |
| 6,547,131 B1 | 4/2003 | Foodman et al. |
| 6,575,832 B1 | 6/2003 | Manfredi et al. |
| 6,577,733 B1 | 6/2003 | Charrin |
| 6,579,179 B2 | 6/2003 | Poole et al. |
| 6,585,598 B2 | 7/2003 | Nguyen et al. |
| 6,601,040 B1 | 7/2003 | Kolls |
| 6,607,441 B1 | 8/2003 | Acres |
| 6,609,978 B1 | 8/2003 | Paulsen |
| 6,628,939 B2 | 9/2003 | Paulsen |
| 6,675,152 B1 | 1/2004 | Prasad et al. |
| 6,676,522 B2 | 1/2004 | Rowe et al. |
| 6,682,421 B1 | 1/2004 | Rowe et al. |
| 6,709,333 B1 | 3/2004 | Bradford et al. |
| 6,715,672 B1 | 4/2004 | Tetro et al. |
| 6,800,029 B2 | 10/2004 | Rowe et al. |
| 6,843,412 B1 * | 1/2005 | Sanford ............... G06Q 20/06 235/379 |
| 6,846,238 B2 | 1/2005 | Wells |
| 6,851,607 B2 | 2/2005 | Orus et al. |
| 6,852,031 B1 | 2/2005 | Rowe |
| 6,866,586 B2 | 3/2005 | Oberberger et al. |
| 6,869,362 B2 | 3/2005 | Walker et al. |
| RE38,733 E * | 5/2005 | Walker ............... G06Q 20/204 463/25 |
| 6,951,302 B2 | 10/2005 | Potts |
| 6,997,807 B2 | 2/2006 | Weiss |
| 7,003,496 B2 | 2/2006 | Ishii et al. |
| 7,094,149 B2 | 8/2006 | Walker et al. |
| 7,168,089 B2 | 1/2007 | Nguyen et al. |
| 7,311,605 B2 | 12/2007 | Moser |
| 2001/0020638 A1 | 9/2001 | Uematsu et al. |

(56) References Cited

U.S. PATENT DOCUMENTS

| | | |
|---|---|---|
| 2001/0022849 A1 | 9/2001 | Simonoff |
| 2001/0044337 A1 | 11/2001 | Rowe et al. |
| 2001/0050311 A1 | 12/2001 | Avellino |
| 2002/0002075 A1 | 1/2002 | Rowe |
| 2002/0026426 A1 | 2/2002 | Bennett |
| 2002/0039921 A1 | 4/2002 | Rowe et al. |
| 2002/0039923 A1 | 4/2002 | Cannon et al. |
| 2002/0045476 A1 | 4/2002 | Poole et al. |
| 2002/0068624 A1 | 6/2002 | Ellis |
| 2002/0103027 A1* | 8/2002 | Rowe ............... G07F 17/32 463/39 |
| 2002/0132664 A1 | 9/2002 | Miller et al. |
| 2002/0147047 A1 | 10/2002 | Letovsky et al. |
| 2002/0175207 A1 | 11/2002 | Kashef et al. |
| 2002/0177479 A1 | 11/2002 | Walker et al. |
| 2002/0193099 A1 | 12/2002 | Paulsen |
| 2003/0033534 A1 | 2/2003 | Rand et al. |
| 2003/0036425 A1 | 2/2003 | Kaminkow et al. |
| 2003/0045353 A1* | 3/2003 | Paulsen ............ G07F 17/3241 463/40 |
| 2003/0078094 A1 | 4/2003 | Gatto et al. |
| 2003/0087692 A1 | 5/2003 | Weiss |
| 2003/0104865 A1 | 6/2003 | Itkis et al. |
| 2003/0105710 A1* | 6/2003 | Barbara ............ G06Q 40/02 705/39 |
| 2003/0106769 A1 | 6/2003 | Weiss |
| 2003/0119585 A1 | 6/2003 | Walker et al. |
| 2003/0176218 A1 | 9/2003 | LeMay et al. |
| 2003/0186747 A1 | 10/2003 | Nguyen et al. |
| 2003/0211878 A1* | 11/2003 | Walker ............. G07F 17/34 463/13 |
| 2003/0211883 A1 | 11/2003 | Potts |
| 2003/0222153 A1 | 12/2003 | Pentz et al. |
| 2003/0228902 A1 | 12/2003 | Walker et al. |
| 2003/0236749 A1 | 12/2003 | Shergalis |
| 2004/0049401 A1 | 3/2004 | Carr et al. |
| 2004/0053693 A1 | 3/2004 | An |
| 2004/0063494 A1 | 4/2004 | Oram et al. |
| 2004/0093303 A1 | 5/2004 | Picciallo |
| 2004/0173673 A1 | 9/2004 | Potts |
| 2004/0214643 A1 | 10/2004 | Parrott et al. |
| 2004/0229671 A1 | 11/2004 | Stronach et al. |
| 2005/0009600 A1 | 1/2005 | Rowe et al. |
| 2005/0054417 A1 | 3/2005 | Parrott et al. |
| 2005/0054446 A1 | 3/2005 | Kammler et al. |
| 2005/0080728 A1 | 4/2005 | Sobek |
| 2005/0091161 A1 | 4/2005 | Gustin et al. |
| 2005/0096124 A1 | 5/2005 | Stronach |
| 2005/0097046 A1* | 5/2005 | Singfield ............ G07F 19/202 705/42 |
| 2006/0148559 A1 | 7/2006 | Jordan et al. |
| 2006/0160610 A1 | 7/2006 | Potts |
| 2007/0060309 A1 | 3/2007 | Yankton et al. |
| 2007/0066386 A1 | 3/2007 | Shields |
| 2007/0213124 A1 | 9/2007 | Walker et al. |

FOREIGN PATENT DOCUMENTS

| | | |
|---|---|---|
| JP | 06004562 | 1/1994 |
| JP | 20011294100 | 10/2001 |
| WO | 9323817 | 11/1993 |
| WO | 9416781 | 8/1994 |
| WO | 9713228 | 4/1997 |
| WO | 0157617 | 8/2001 |

OTHER PUBLICATIONS

Burbank, Jeff, "Despite Critics, new ATMs roll in", Las Vegas Business Press, Jun. 28, 1999, 3 pages.

Neal, Emily, "Casino credit under fire", Journal Starr, May 8, 2000, 3 pages.

Quinn, William, "Worth Their Weight in Gold", Global Gaming Business Apr. 1, 2003, pp. 24-26.

* cited by examiner

EXAMPLE ID CARD MACHINE READABLE INFORMATION (ASCII)

52a—Track 1: %MNANYTOWN^JOHN JACK DOE^111 ANYSTREET?

52b—Track 2: ;1234569999888888=02101968020604?

52c—Track 3: # 55123     D     M072190    BRN    ?

State Identifier Code
60
MNv2

FORMAT
62
Track 1:

{start sentinel} = position 1
{state identifier code} = positions 2,3
{city} = position 4-first delimiter;
" " = "space"
{name} = second field (first delimiter-second delimiter);
{FIRST MIDDLE LAST};
" " = "space"
{address} = third field (second delimiter-end sentinel);
" " = "space"

Track 2:
{start sentinel} = position 1
{id number, numeric component} = position8-first delimiter
{id number, Alpha prefix} = positions (end sentinel – 2), (end sentinel – 1);
{id number} = (Alpha prefix, numeric component}

Track 3:
{start sentinel} = position 1
{zip code} = positions 4-8

JOHN JACK DOE
111 ANYSTREET
ANYTOWN, MN 55123
State ID Number D999999888888

Payable in the amount of: five hundred dollars and no cents ($500.00)

JOHN JACK DOE

FIG. 6

SYSTEM AND METHOD FOR CHECKLESS CASH ADVANCE SETTLEMENT

RELATED APPLICATION DATA

This application is a continuation of U.S. application Ser. No. 15/954,404, filed Apr. 16, 2018, which is a continuation of U.S. application Ser. No. 14/969,916, filed Dec. 15, 2015, now U.S. Pat. No. 9,959,585, which is a continuation of U.S. patent application Ser. No. 14/231,029, filed Mar. 31, 2014, now U.S. Pat. No. 9,224,143, which is a continuation of U.S. patent application Ser. No. 13/245,516, filed Sep. 26, 2011, now U.S. Pat. No. 9,171,303, which is a continuation application of U.S. patent application Ser. No. 12/268,857, filed Nov. 11, 2008, now U.S. Pat. No. 8,025,216, which is a continuation application of U.S. patent application Ser. No. 11/223,708, filed Sep. 9, 2005, now U.S. Pat. No. 7,461,780, which claims the benefit of U.S. Provisional Application No. 60/608,196, filed Sep. 9, 2004. Each of said prior applications is incorporated by reference as if set forth fully herein.

BACKGROUND OF THE INVENTION

The present invention relates to a system and method for performing checkless cash advance settlement transactions, particularly in a casino environment.

A number of aspects related to casino gaming and operation are becoming increasingly sophisticated. Casino patrons enjoy playing the plethora of unique video slot, poker, and other electronic games of chance. Other technological advancements, such as card shuffling machines, chip handling devices, etc., enhance the customer's perception of casino security and fairness. Each of these factors contributes to a heightened desire to visit and participate in gaming activities at a particular casino, a result clearly desired by casino operators.

As a result of these activities, casino gaming is a highly popular activity in today's society. Often times, a particular individual's enjoyment of the casino gaming experience is predicated upon having a sufficient supply of money that in turn allows the patron to participate in gaming activities for a desired length of time. In a most basic form, the customer simply brings a sufficient amount of currency (or "cash") with him/her to the casino that can be exchanged for negotiable chips/casino issued gaming cards and/or used with various gaming machines. Invariably, a customer may forget to bring a desired amount of currency with him/her to the casino, and/or depletes the supply of currency brought to the casino before he/she is ready for their gaming experience to end. Under these circumstances, the customer will desire to access additional monies otherwise available through one or more financial institutions at which the customer maintains an account. For example, the customer can utilize an automatic teller machine ("ATM") located on the casino's premises.

An additional mechanism by which a casino customer can access an off-site financial account is via a cash advance transaction from a credit-type account owned by the customer. Most casinos are equipped to handle cash advance transactions, whereby the customer presents a financial institution card to a casino employee. As used throughout this specification, the phrases "financial institution card" or "financial card" are in reference to a credit card, debit card, or bank card. To this end, casinos often provide a central "cage" station at which a teller is available for processing a financial card cash advance transaction. Regardless, the customer's financial card is processed by a designed electronic processing unit that is otherwise connected (such as via a phone line) to a financial transaction processing service provider. The service provider automatically reviews the relevant financial card information and desired cash advance amount, and either authorizes or denies the requested transaction. If approved, the casino employee (or other person designated by the casino for performing cash advance transactions, such as third party cash advance cash advance service provider) then prepares a quasi-cash document for the customer to execute and then exchange for cash and/or casino-issued chips or gaming card (e.g., a magnetic swipe card issued by the casino that, via interaction with a central database, maintains a credit account for the customer with the casino). In general terms, and as is known in the art, a quasi-cash document is akin to a check or money order and represents a negotiable instrument once signed by the customer. Thus, the quasi-cash document must include not only the cash advance dollar amount, but also customer identification information including full name, street address, and in some instances state identification number (e.g., driver license number) and telephone number.

While the casino employee (or other designated person/service provider) likely has access to a computerized system that facilitates automatic printing of the quasi-cash document, the customer identification information must be manually entered into the system by the casino employee. Unfortunately, this can be a relatively time-consuming task, especially where the customer has a unique name and/or address. In this regard, it is commonplace for multiple casino customers to virtually simultaneously desire to perform a cash advance transaction. Thus, even if the manual entry of customer identification information requires only a few minutes of the casino employee's time, where several patrons are waiting in line, the cumulative delay can become discouraging. Clearly, casinos have a vested interested in maintaining a high level of customer satisfaction, but also to avoid situations that might otherwise dissuade a customer from obtaining additional funds that in turn are used to participate in casino gaming activities.

Financial institution card cash advance transactions are a common place in casinos. However, existing cash advance systems require manual entry of customer identification information as part of the quasi-cash document generating process. This requirement entails unacceptable delays in completing an individual transaction. Therefore, a need exists for a system and method of performing a quasi-cash transaction for a customer, such as a casino customer, in an expedited fashion.

In addition to the issues outlined above, certain additional drawbacks remain related to cash access. In particular, casino customers are presently unable to perform a monetary advance transaction directly from the gaming station at which the customer is located. Instead, the casino customer is required to walk away from the gaming activity in which he/she is engaged, locate an appropriate transaction machine/station, and perform the desired financial transaction. For example, while convenient, ATMs are typically dispersed at various locations within the casino, away from individual gaming stations. Alternatively, a credit card-type transaction can be performed as outlined above (i.e., through a casino teller, or other designated individual, otherwise residing at a central "cage" station). Even further, while cash advance kiosks have recently become highly popular and provide certain conveniences to customers, the customer is still required to leave the gaming station to perform the desired financial transaction.

Casino customers can be frustrated when having to leave a gaming station to perform a monetary advance transaction. A popular gaming strategy is to continue playing a particular gaming activity after successive losses based upon a belief that the customer is "due" to win in the near future. For example, slot machine players often enjoy remaining at a particular slot machine for an extended length of time, theorizing that the slot machine will produce a large jackpot after a certain number of plays. Similarly, black jack, roulette, craps, etc.; players often desire to stay at a particular gaming table to "ride out" a losing streak, assuming that one or more winning wagers are soon to occur. Being forced to leave the gaming station to obtain additional funds undermines this gaming strategy, and is thus disconcerting to the casino customer. The casino also has a vested interest in not only keeping customers happy, but also encouraging customers to continue playing at a particular gaming station.

Therefore, a need exists for a system and method of performing a financial transaction at a gaming station in a manner that satisfies prescribed security regimens.

SUMMARY OF THE INVENTION

One aspect of the present invention relates to a method of performing a quasi-cash transaction for a customer. The method includes receiving information from the customer relating to a desired transaction dollar amount. A State or government identification card issued to the customer is electronically processed to retrieve machine-readable information stored on the identification card. Customer identification information is electronically parsed from the retrieved machine-readable information. Quasi-cash document information is electronically generated utilizing the desired dollar amount and at least a portion of the electronically parsed customer identification information. Finally, a quasi-cash document is printed, with the quasi-cash document including and displaying the generated quasi-cash document information. In one preferred embodiment, the parsed customer identification is the customer's name. In another preferred embodiment, additional customer identification information is parsed from the retrieved machine-readable information, including customer address. In yet another preferred embodiment, processing of the machine-readable information includes determining a format of the machine-readable information based upon reference to a database.

Another aspect of the present invention relates to a system for performing a quasi-cash transaction for a customer. The system includes a card reader, a processor, and a printer. The card reader is adapted to read machine-readable information stored on a State identification card issued to the customer. The processor is electrically connected to the card reader and is adapted to receive information from the customer relating to a desired transaction dollar amount and receive the machine-readable information from the card reader. Further, the processor is adapted to parse customer identification information from the machine-readable information, and to generate quasi-cash document information based upon the desired dollar amount and the parsed customer identification information. Finally, the printer is electrically connected to the processor and is adapted to print a quasi-cash document based upon the generated quasi-cash document information as provided by the processor. In one preferred embodiment, the card reader is further adapted to read machine-readable information stored on a financial institution card provided by the customer, and the processor is adapted to perform a transaction approval operation. In another preferred embodiment, the processor is adapted to recognize a format of the machine-readable information based upon reference to a database maintained by the processor.

Yet another aspect of the present invention relates to a method of performing a quasi-cash transaction for a customer in a casino. The method initially includes receiving information from the customer relating to a desired transaction dollar amount. A State or government identification card, otherwise issued to the customer, is delivered from the customer to a casino designee. The casino designee operates a card reader to retrieve machine-readable information stored on the State identification card. Customer identification information is then electronically parsed from the retrieved machine-readable information. Quasi-cash document information is electronically generated utilizing the desired dollar amount and the electronically parsed customer identification information. A quasi-cash document is then printed that includes and displays the quasi-cash document information. Finally, the casino designee delivers the quasi-cash document to the customer. In one preferred embodiment, the customer executes and exchanges the quasi-cash document for a cash or casino-issued negotiable instrument such as chips or casino gaming card.

Another embodiment of the present invention provides a method of performing a financial transaction within a casino by a casino customer located at a casino gaming station. The method includes providing a portable, remote control unit (RCU) to the casino customer at the casino gaming station. Transaction information is entered into the RCU relating to a financial transaction desired by the casino customer from an account owned by the customer. The transaction information is signaled from the RCU to a base processor via a wireless transmission. The RCU is operated to electronically capture a signature of the casino customer, with this electronically captured signature being signaled from the RCU to the base processor via a wireless transmission. Finally, the base processor is operated to print, via a printer electronically connected to the base processor, a negotiable financial document based upon the transaction information. In this regard, the printed negotiable financial document includes the customer's signature, generated by the base processor based upon the electronically captured signature. In one preferred embodiment, the RCU designates to the base processor a location of the gaming station, and a negotiable instrument is delivered to the casino customer following printing of the negotiable financial document based upon the designated gaming station location. In this regard, and in yet another preferred embodiment, the delivered negotiable instrument includes at least one of cash, casino-issued chips, casino-issued gaming card, a check, or the printed negotiable financial document.

A further aspect of the present invention relates to a system for performing a financial transaction within a casino by a casino customer located at a casino gaming station. The system includes a remote control unit (RCU), a base processor, and a printer. The RCU is deliverable to the gaming station, and is adapted to receive transaction information relating to a financial transaction desired by the casino customer from an account owned by the customer. The RCU preferably includes a card reader to process financial cards and State issued ID cards in order to streamline the receipt of information. Further, the RCU is adapted to electronically capture a signature of the casino customer, and wirelessly signal the transaction information and the electronically captured signature. The base processor is adapted to receive wireless signals from the RCU and generate negotiable financial document formatting information based upon the transaction information and the electronically captured signature. Finally, the printer is electronically connected to the base processor. The printer utilizes the negotiable financial document formatting information to print a negotiable financial document that includes the customer's signature. With this system, a casino customer can perform a desired financial transaction without leaving the gaming station at which he or she is participating in a gaming activity.

DESCRIPTION OF THE DRAWINGS

FIG. 2 is a schematic illustration of machine-readable information, in ASCII format, provided by an exemplary State identification card;

FIG. 4 is a block diagram illustrating exemplary entries associated with the database of FIG. 3;

FIG. 6 is an illustration of an exemplary quasi-cash document generated by the system and method of the present invention.

DETAILED DESCRIPTION OF THE INVENTION

Figure 1:
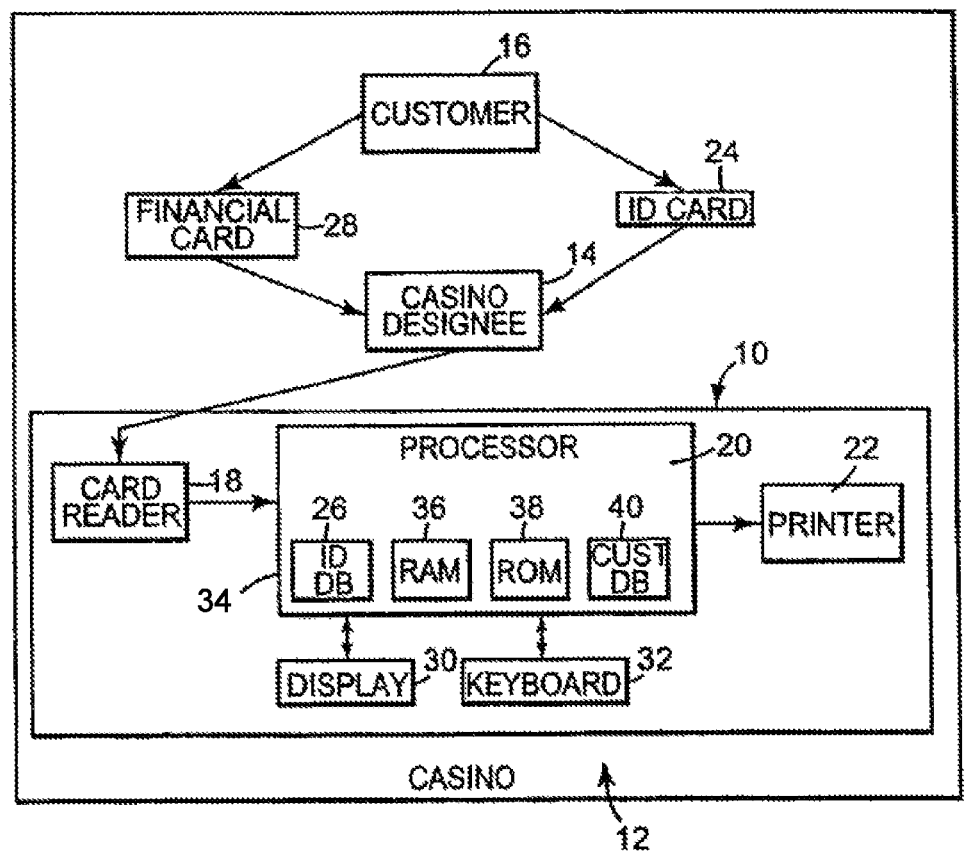
FIG. 1 is a block diagram of a quasi-cash transaction system in accordance with an embodiment of the present invention.

One embodiment of a quasi-cash transaction system 10 in accordance with the present invention is shown in block form in FIG. 1. In a preferred embodiment, the quasi-cash transaction system 10 is utilized within a casino 12 at which a casino designee 14 (e.g., casino teller, pit boss, runner, employee of a third party cash advance service provider, etc.) facilitates the quasi-cash transaction for a customer 16. Alternatively, the system 10 of the present invention may be utilized in other environments. Regardless, the system 10 preferably includes a card reader 18, a processor 20, and a printer 22. These components are described in greater detail below. In general terms, however, the card reader 18 and the printer 22 are electrically connected to the processor 20.

As part of a quasi-cash transaction, the casino designee 14 obtains a State or government identification card 24 from the customer 16. Although a State identification is discussed below, it is understood that other types of identification cards could also be used. As described below, the State identification card 24 provides identification information in a machine-readable form. The card reader 18 is operated to retrieve the machine-readable information from the State identification card 24, with this information being signaled to the processor 20. The processor 20, in turn, compares the retrieved machine-readable information with formatting information provided by an identification card database 26 (denoted as "ID DB" in FIG. 1). Based upon this comparison, the processor 20 parses desired customer identification information from the retrieved machine-readable information, and generates quasi-cash document information based upon the parsed information. The processor 20 prompts the printer 22 to print an appropriate quasi-cash document (not shown) that otherwise includes and displays the parsed customer information. The casino designee 14 then delivers the quasi-cash document to the customer 16. In one preferred embodiment, the parsed customer identification information is stored in a database (described below) for reference in future transactions. Unlike existing cash advance transaction techniques, the system and method of the present invention preferably does not require the casino designee 14 to manually enter customer identification information as part of the quasi-cash document generation process.

The card reader 18 is of a type known in the art and is adapted to read and decode machine-readable information stored on a State identification card 24. In this regard, the State identification card 24 can assume a wide variety of forms, but is generally in reference to an identification card, such as a driver's license, issued by a State of the United States of America. To this end, most State identification cards provide identification information in machine-readable form. Exemplary technologies for presenting this machine-readable information include magnetic stripe, integrated circuit, finger imaging, optical memory, bar code (two-dimensional), and digital images. The card reader 18 is thus adapted to read and decode information provided by the particular card technology. Magnetic stripe and bar code techniques are most common, such that the card reader 18 is preferably a magnetic card swipe reader that reads and decodes information on the magnetic strip provided by the State identification card 24. The card reader 18 sends information to a decode logic module (not shown) which converts a serial bit stream from the card reader 18 into a byte-wide stream for input to the processor 20. Alternatively, the card reader 18 can be a "dip" card reader, etc. Because most financial cards also include a magnetic stripe with machine-readable information, the card reader 18 is further preferably adapted to read and decode information from a financial card 28 of the customer 16.

The processor 20 is a microprocessor-based device, capable of storing information and performing desired operations. In this regard, the processor 20 preferably includes and/or is connected to a display screen 30, a keypad 32, a transmission line 34, RAM 36, ROM 38, and the identification card database 26. The software used to control operation of the processor 20 is stored in the ROM 38. Further, the identification card database 26 (as well as other databases such as a customer database 40) are preferably stored in the ROM 38 (it being noted that FIG. 1 illustrates the identification card database 26 and the customer database 40 separate from the ROM 38 for ease of illustration). Conversely, information entered via the display 30, the keypad 32, and/or the card reader 18 is stored by the processor 20 in the RAM 36 for further processing. To this end, the display 30 and the keypad 32 are of types known in the art and can assume a variety of forms. For example, the keypad 32 can be a keyboard, and the display 30 can be a touch-screen display. One or both of the display 30 and/or the keypad 32 can be eliminated depending upon desired operation of the system 10. Finally, the transmission line 34 provides a communication link to off-site resources, such as a financial transaction processing service provider, for example Vital Processing Services of Tempe, Ariz.

Operation of the processor 20 to process financial card information is known. However, electronic processing of State identification card information in accordance with the present invention represents a distinct advancement in the art. In general terms, the processor 20 is adapted to parse desired customer identification information from the State identification card 24 (as otherwise read and decoded by the card reader 18) based upon reference to the identification card database 26. As described in greater detail below, the identification card database 26 preferably includes a listing of format designations for identification cards associated with multiple States (preferably, the identification card database 26 includes formatting designations for all fifty States) or other identification card issuing bodies.

As a starting point, the American Association of Motor Vehicle Administrators (AAMVA) has established certain general formatting standards for machine-readable information stored on a State identification card. These standards are outlined in a publication entitled "AAMVA National Standard for the Driver's License/Identification Card" (2000), commonly referred to as "AAMVA DL/ID 2000". As previously described, virtually all current State identification cards present the machine-readable information via a magnetic stripe or a bar code. In this regard, current magnetic stripe technology presents three tracks containing certain identification information; bar codes are typically read in a two-dimensional format. The AAMVA DL/ID 2000 recites required and optional data elements for each of the tracks, as well as preferred format conventions. Within each required data element and format convention, however, numerous variations are acceptable such that a universal "standard" does not exist. In fact, the formatting of the machine-readable information distinctly varies from State-to-State. Thus, the processor 20 must be adapted to recognize the originating State of the customer's State identification card 24 and, based upon reference to the identification card database 26, determine the formatting utilized by the particular State identification card 24 and thus the "location" of relevant information.

For example, FIG. 2 presents a decoded listing of the machine-readable information (in ASCII format) provided by a hypothetical State identification card issued by the State of Minnesota. The machine-readable information (referenced generally at 50) is presented in three tracks 52*a*, 52*b*, and 52*c*. With respect to track 1 (52*a*), a series of ASCII characters are presented. Each character occupies a designated data stream location position. For example, the character "%" is located at Position Number 1, whereas the character "?" is located at Position Number 40 (with the one example of FIG. 2). Pursuant to the AAMVA DL/ID 2000 standards, certain characters are designated as sentinels and other characters represent field delimiters. AAMVA DL/ID 2000-accepted ASCII sentinels include "%", ";", "#" as start sentinels; "?" as an end sentinel; " " and "=" as field delimiters. With these designations in mind, the converted ASCII character associated with Track 1 (52*a*) of FIG. 2 includes the start sentinel "%" at Position Number 1. Position Numbers 2 and 3 provide a state identifier code ("MN" in the example of FIG. 2). Following the state identifier code, the remaining characters up to the first field delimiter (the first " " at position 12 in FIG. 2) represent the city component of the cardholder's address. Thus, with respect to the example of FIG. 2, the cardholder's city is "ANYTOWN" (provided by the characters in Positions 4-11). In effect, the information presented between the start sentinel ("%") and the first field delimiter (" ") can be designated as {Field 1}.

The characters presented between the first field delimiter (the " " at Position 12) and the second field delimiter (the " " at Position 26) represents {Field 2}, and provides the cardholder's name. Thus, with respect to the example of FIG. 2, Track 1 (52*a*) recites that the cardholder's name is "JOHN JACK DOE". This name format/convention (e.g., first middle last) is not an AAMVA requirement. In fact, many states utilize differing formats/conventions (e.g., last first middle). Further, the use of a blank space between the name components (e.g., the blank character spaces at Track 1 Positions 17 and 22 in the example of FIG. 2) is not universally employed. For example, identification cards issued by the State of Ohio employ a "$" instead of a blank space (e.g., the name formatting for Ohio is "last$first$MI").

Finally, the characters presented between the second field delimiter (e.g., the " " at Position 26) and the stop sentinel (e.g., the "?" at Position 40) is designated as {Field 3} and provides the cardholder's street address. Thus, with reference to the example of FIG. 2, the cardholder's street address is "111 ANY STREET". Once again, the presentation of the street address information varies from state-to-state. For example, where the cardholder's street address includes a P.O. Box number, some states (such as Wisconsin) do not include the ASCII characters "P.O. Box". Thus, where the cardholder's street address is "P.O. Box 123", a State identification card issued by the State of Wisconsin will only provide "123" in the {Field 3}, whereas other states will include "P.O. Box 123".

Track 2 (52*b* of FIG. 2) typically includes information relating to Federal/State Identification Code, identification card number, expiration date, and date of birth. With reference to the example of FIG. 2, following the start sentinel (";" at Position 1), the next six characters (Positions 2-7) provide the Federal or State Identification Code ("123456" with the example of FIG. 2). Identification card number information is then provided. In this regard, formatting of the identification card number varies greatly from state-to-state. The difficulty in accurately designating the identification card number form the Track 2 data stream is further complicated by the fact that, pursuant to AAMVA DL/ID 2000 standards, Track 2 (52*b*) normally does not include alpha characters; however, the actual identification card number assigned by the issuing body (e.g., the State that issues the identification card) oftentimes does include at least one alphabetic character (typically an alpha prefix). For example, the identification card number associated with the example of FIG. 2 is "D999999888888". The numeric component is found following the Federal Identification Code (e.g., beginning at Position 8) through the field delimiter ("=" at Position 20). With Minnesota State identification cards, the alpha prefix component is presented in numeric form via the two numbers appearing immediately before the stop sentinel ("?" at Position 35 in FIG. 2). With reference to the example of FIG. 2, then, the two numbers found immediately preceding the stop sentinel are "04" (Positions 33 and 34). The numeric "04" translates to the letter "D". Once again, this is but one formatting convention. For example, many states employ a two letter alpha prefix for the identification card number; under these circumstances, one or both of these alpha prefix characters can be represented in numeric form within Track 2. Further, the location of the alpha prefix designator varies from state-to-state. For example, Ohio puts both alpha prefix numeric designations at the front of the numeric component of the identification number. Regardless, following the field delimiter ("="), expiration date and date of birth information are provided. With respect to the example of FIG. 2, Minnesota designates the expiration date information in Track 2 as (MMYY), such that the exemplary identification card of FIG. 2 expires in February 2010 (i.e., "0210" at Positions 21-24). Other states may include a century designation and/or a day of month of expiration. Similarly, representation of the cardholder's date of birth may also vary. With respect to the example of FIG. 2, the date of birth information is presented at Positions 25-32, and is found to be "19680206", representing a date of birth of Feb. 6, 1968. Other states may not include reference to the century and/or may change a positioning of the day, month, and/or year formatting.

Finally, Track 3 (52*c*) is not found on many State-issued identification cards. For those State identification cards that do provide a Track 3, of particular interest is the zip code information presented a certain number of positional spaces after the start sentinel ("#"). Minnesota State identification cards, for example, provide the zip code three positional spaces after the start sentinel (e.g., Positions 4-8). Thus, with the example of FIG. 2, the cardholder's zip code is "55123". Other States locate the zip code, along with other information, at differing locations in Track 3 and/or in other tracks (especially where the particular State identification card machine-readable information technology does not provide three tracks).

As described below, the system and method of the present invention 25 addresses the wide-ranging differences in identification card information formatting to provide a universally applicable system (i.e., not limited to reviewing identification card information from only one State). An additional complication addressed by the system and method of the present invention is that many states have issued multiple identification card versions having varying machine-readable information formatting. Over time, with the evolution of technology, more information can be supplied within the machine-readable component of an issued State identification card. However, it is impossible to remove "older" versions from circulation. Thus, for example, Minnesota has two identification card versions currently available, with the older version (Version 1) providing only two tracks and the new version (Version 2) providing three tracks. The Version 1 identification information formatting does not correlate with the Version 2 formatting.

Figure 3:
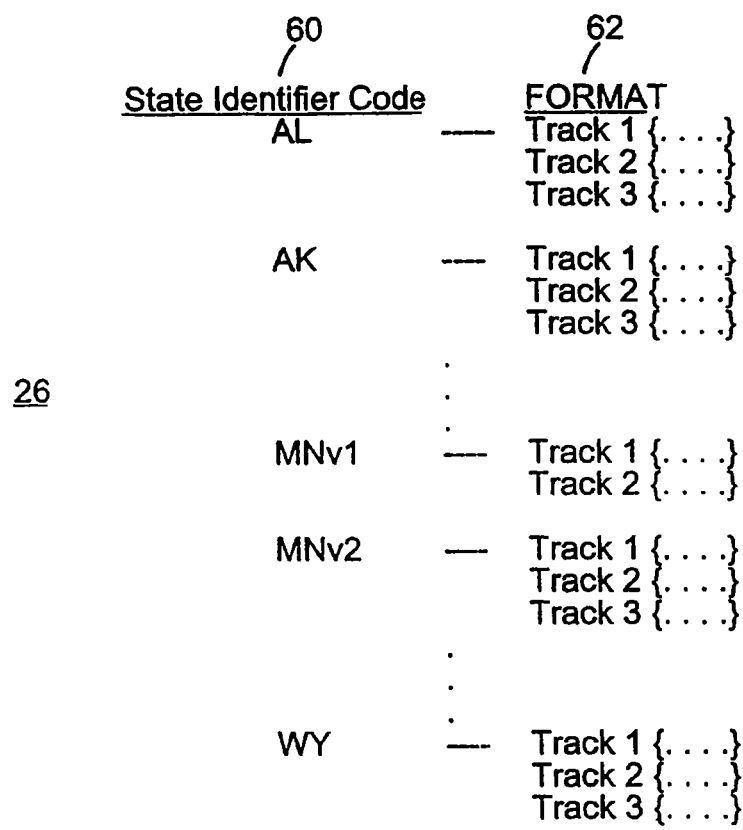
FIG. 3 is a block diagram illustrating an identification card database in accordance with one embodiment of the present invention provided with a processor component of the system of FIG. 1.

With the above designations in mind, the identification card database 26 (FIG. 1) associated with the processor 20 (FIG. 1) of the present invention preferably provides a listing of all available State identification cards and corresponding track formatting. In this regard, FIG. 3 provides an enhanced representation of information provided with the database 26. Each entry within the database 26 includes a state identifier code (represented generally at column 60) that is matched with machine-readable information formatting associated with that state's identification card (represented generally at column 62). In a preferred embodiment, the database 26 includes entries for all fifty States, as well as other regions/entities that issue standard identification cards (e.g., District of Columbia, Puerto Rico, military, etc.). Alternatively, formatting for less than all fifty States can be provided. Preferably, however, the database 26 includes entries for at least twenty-five different State identification cards. As shown in FIG. 3, the state identifier code "AL" is the first entry under the state identifier code column 60, representing an identification card issued by the State of Alabama. The formatting column 62 provides the track formatting details associated with an Alabama identification card. In other words, the formatting designations associated with an Alabama-issued identification card include, for example, the location and ordering of first, middle, and last name components in Track 1; the location and ordering of address components in Track 1; the formatting of identification card number in Track 2; etc., are provided. FIG. 3 further reflects the preferred embodiment in which the database 26 includes formatting peculiarities associated with a state having two or more identification card versions in circulation. In particular, FIG. 3 illustrates entries for two versions of Minnesota-issued identification cards.

Specific formatting designations for an exemplary Version 2 Minnesota-issued State identification card, otherwise provided within the format column 62, are shown in FIG. 4. The Version 2 Minnesota State identification card includes three tracks. For each track, specific formatting conventions associated with the Version 2 Minnesota State identification card is provided. For example, with respect to Track 1, the formatting requirements designate a start sentinel at ASCII Position 1; a state identifier code at ASCII Positions 2-3; city identification at ASCII Position 4 through a first delimiter; name identification components at ASCII characters between the first and second delimiters; and address and identification at ASCII characters between the second delimiter and the end sentinel. Within each designated field, formatting details are further provided (e.g. the ordering of name components, identifying unique characters such as a "blank" ASCII position, etc.). Similar formatting conventions are provided for Tracks 2 and 3. Once again, because most states have certain formatting idiosyncrasies, each format recited in the database 26 will be unique to an issuing state and/or version.

Figure 5:
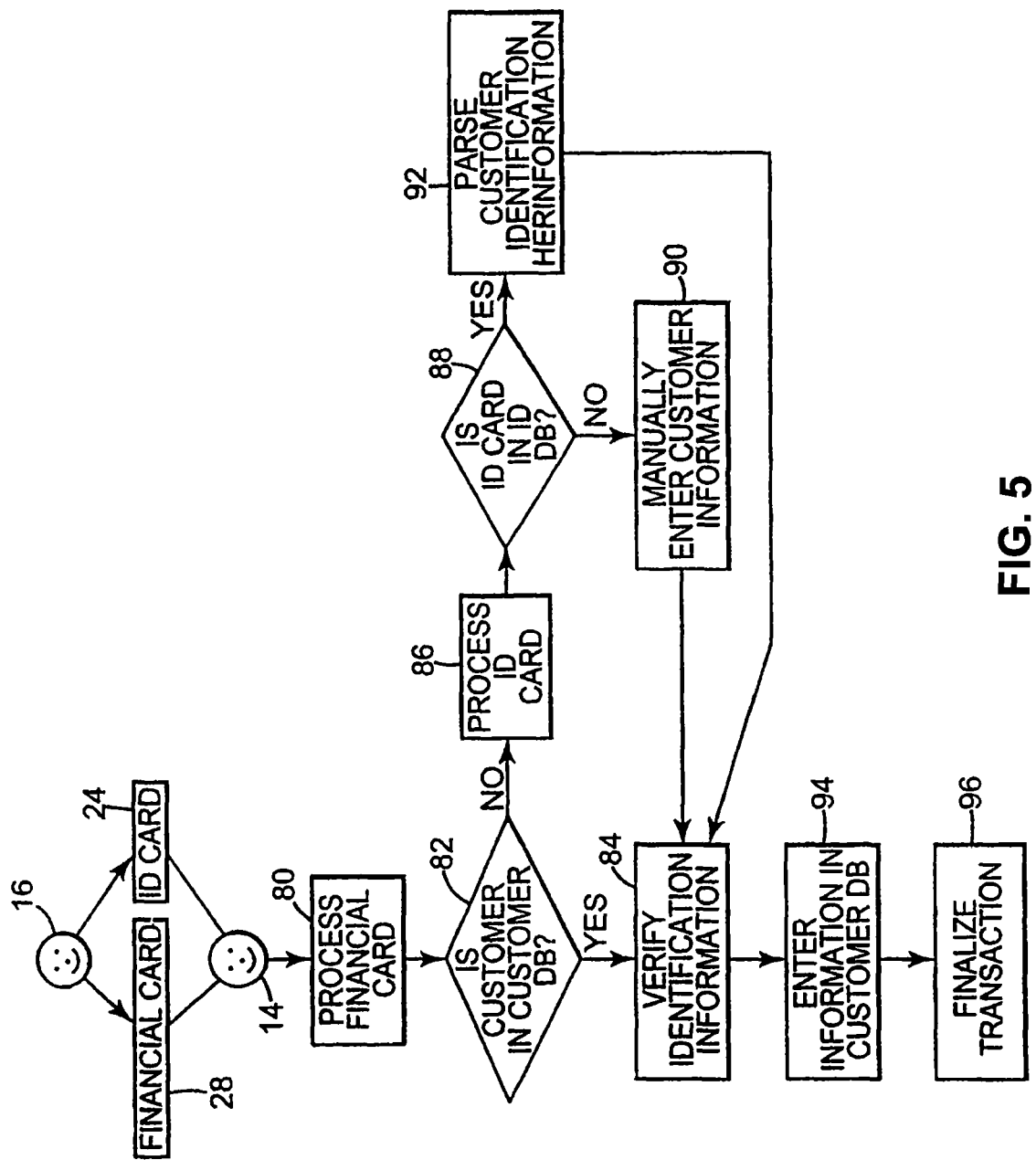
FIG. 5 is a flow diagram of a method in accordance with the present invention.

During use, and with reference to FIG. 1 and the simplified flow diagram of FIG. 5, the customer 16 approaches the casino designee 14 to initiate a quasi-cash transaction (e.g., a cash advance transaction). The customer 16 provides the casino designee 14 with their financial institution card 28 and State identification card 24. At step 80, the casino designee 14 processes the financial institution card 28 in a known fashion. For example, the casino designee 14 "swipes" the financial institution card 28 through the card reader 18, and enters a desired transaction dollar amount via the keyboard 32 and/or the display 30 (where the display 30 is a touch-screen display). The processor 20 performs a transaction authorization routine whereby the financial institution card 28 information and desired dollar amount are signaled, via the transition line 34, to a financial transaction processing service provider that authorizes or denies the desired transaction. Assuming the desired transaction is authorized, the processor 20 references the customer database 40 to determine whether identification information associated with the customer 16 (recognized via processing of the financial card 28 above) is available at step 82. If the customer identification information is already available to the processor 20, the transaction information is generated and verified at step 84, as described in greater detail below. If sufficient customer identification information is not available (e.g., the customer 16 is not listed in the customer database 40 or the information saved in the customer database 40 does not include entries for all categories required for the quasi-cash document), the casino designee 14 processes the State identification card 24 at step 86.

In particular, the casino designee 14 operates the card reader 18 to process the machine-readable information provided with the State identification card 24. Once again, this machine-readable information can be provided in a variety of formats, but is conventionally provided as a magnetic stripe or bar code. The card reader 18 decodes the machine-readable information (e.g., hexadecimal machine-readable information) provided with the State identification card 24 into an ASCII format, with this data stream being signaled to the processor 20. The processor 20, in turn, determines whether the state/entity otherwise issuing the State identification card 24 is available in the identification card database 26 at step 88. In particular, the processor 20 retrieves the state identifier code found in Track 1 of the machine-readable information. As previously described, the state identifier code is a two-alpha character component found at Positions 2 and 3 of Track 1 (e.g., with reference to the example of FIG. 2, the state identifier code immediately follows the start sentinel in Track 1). The so-identified state identifier code is then compared with the listings provided in the identification card database 26. For example, with reference to FIG. 3, the state identifier code column 60 is reviewed to determine whether the state identifier code associated with the processed State identification card 24 is available. To this end, where the identification card database 26 indicates that a particular state has multiple State identification card versions, the processor 20 further determines a version of the particular State identification card 24 being processed and whether formatting for that version is available within the identification card database 26. For example, with reference to FIG. 3, where a determination is made that the particular State identification card 24 is a Minnesota identification card, the processor 20 reviews the data stream provided by the card reader 18 to determine whether two or three tracks are present. If three tracks are present, the processor 20 concludes that the State identification card 24 is a Minnesota Version 2 State identification card; where only two tracks are present, Version 1 is designated. Depending upon the multiple version formats employed by a particular State, the processor 20 can determine a version of the State identification card in other manners.

If, at step 88, it is determined that the identification card database 26 does not include formatting information relating to the particular State identification card 24, the casino designee 14 is prompted, at step 90, to manually enter customer identification information via the keyboard 32 and/or the display 30. Conversely, where the identification card database 26 does provide formatting information for the State identification card 24 being processed, requisite customer identification information is parsed from the data stream at step 92.

In particular, the processor 20, with reference to the formatting requirements identified by the identification card database 26, reviews the information presented in Tracks 1, 2, and 3 (where three tracks are present). In this regard, the customer identification information required for a "complete" quasi-cash document can vary, but will normally include at least the customer's 16 name. The customer's name must be presented in proper order (e.g., first name, middle name, last name); based upon the formatting parameters presented by the identification card database 26, the processor 20 will accurately parse each component of the customer's name from Track 1 and assign proper order to the parsed customer name information, regardless of the unique presentation of customer name information employed by the State issuing the State identification card 24.

Additional customer identification information can also be parsed from the track data streams, including, for example, address, identification card number, expiration date, date of birth, telephone number, etc. In a most preferred embodiment, the customer's full name, address and identification card number are parsed. The identification card database 26 facilitates the processor 20 accurately parsing this information and storing in proper order, along with addressing idiosyncrasies of certain State identification card formatting. For example, where the identification card number includes an alpha prefix component and the associated Track 2 data stream presents the alpha prefix in numeric form offset from the numeric component, the processor 20, based upon reference to the identification card database 26 formatting instructions, parses the alpha prefix component, converts to alphabetic form, and properly orders the alpha prefix relative to the parsed numeric component.

The desired, parsed customer identification information (or the customer identification retrieved from the customer database 40 at previous step 82) is then verified by the casino designee 14 at step 84. In particular, the processor 20 generates quasi-cash document information required for proper issuance of a quasi-cash document. To ensure that the later-printed quasi-cash document is accurate, the casino designee 14 verifies the information, such as by reviewing the generated quasi-cash document information via the display 30. If errors are noted and/or if additional information is needed, the casino designee 14 can manually enter/edit the information, such as via the keyboard 32 and/or the display 30. Further, and in one preferred embodiment, the casino designee 14 verifies that a photograph appearing on the State identification card 28 is that of the customer 16.

Once the quasi-cash document information has been verified, the customer identification information is preferably stored in the customer database 40 provided by the processor 20 at step 94. Subsequently, the quasi-cash transaction is finalized at step 96.

In particular, the quasi-cash document information, as otherwise generated by the processor 20, is formatted in conjunction with the desired (and approved) dollar amount for printing on a quasi-cash document. An exemplary quasi-cash document is shown at 100 in FIG. 6. The quasi-cash document 100 includes the desired transaction dollar amount, along with the customer identification information, as retrieved from the machine-readable information associated with the State identification card 24. Thus, the quasi-cash document 100 will preferably include the customer's name, with name components presented in proper order, and possibly other relevant information, such as address, identification card number, date of birth, etc. To this end, the appearance of the customer identification information can vary from that shown in FIG. 6. For example, the customer's last name can appear first, a middle initial provided, etc. Because the system and method of the present invention is able to accurately assign the parsed information into desired categories (e.g., first name, last name, city, zip code, identification card number, etc.), the identification information on the quasi-cash document 100 can be accurately presented in any desired format. Notably, the customer identification information displayed on the quasi-cash document 100 need not include all information parsed from the identification card 24.

The processor 20 prompts the printer 22 to print the quasi-cash document 100. Once printed, the quasi-cash document 100 is presented to the customer 16 in an unsigned form. The customer 16 can then, if he/she so chooses, execute the quasi-cash document 100 and provide it to the casino designee 14 who then exchanges the executed quasi-cash document 100 for cash and/or casino-issued negotiable items (e.g., chips, casino gaming card, etc.).

The quasi-cash document can take a number of forms, including a physical negotiable instrument or a non-negotiable receipt. In one embodiment, where the document is a negotiable instrument such as a money order, the cash advance transaction flow of funds proceeds as follows: (1) the customer initiates a Debit or Credit POS transaction via one of several possible systems, e.g., Kiosk or ATM; (2) the customer receives authorization or denial from the selected system; (3) if authorized, the customer proceeds to the cashier's cage or central cage station and provides to a cashier identification and the credit/debit card used to initiate the transaction; (4) the cashier validates the customer's identity based on the identification, retrieves the transaction information using the selected system or a cash advance application that is networked to and interfaces with the selected system, and completes the cash advance application; (5) the selected system or the cash advance application prints a negotiable instrument presentable to the casino or a third-party facilitator of the process; (6) the customer endorses the negotiable instrument payable to the casino or the third-party facilitator, (7) the casino reimburses the customer for amount of the negotiable instrument, less a commission if appropriate, with cash or another casino-issued negotiable item (e.g., chips, casino gaming card, etc.); and (8) the casino deposits the negotiable instrument into its financial institution to receive funds from the financial institution or the third-party facilitator for the amount of the instrument.

As described above, the physical instrument is generated and then endorsed by the customer conducting the transaction. The negotiable instrument provides at least two functions: (1) the document is a negotiable item that the casino can use to receive reimbursement from a financial institution or a third-party facilitator; and (2) the document serves as proof that the transaction was completed and the customer received his cash. Casinos typically deposit such negotiable instruments with a financial institution at the end of each business day. The checks then follow the typical processing and clearing process involved with posting such items. Another embodiment is now described that requires even less paperwork and processing steps involved in depositing a physical instrument.

In another embodiment, a receipt is printed in lieu of a negotiable instrument. This is a "checkless" cash advance transaction. As described in more detail herein, the "checkless" cash advance transaction generates a non-negotiable draft rather than an actual negotiable instrument as a transaction receipt. The casino customer is still required to sign the draft or a receipt to complete the transaction (this signed receipt provides proof of cash dispersal should a dispute arise), but rather than filing it for subsequent deposit, the document is stored physically or electronically scanned via a scanner, e.g. a Magtek check scanner, and the image is electronically stored by the casino or sent to a third-party facilitator. These physical receipts or electronic images can then be used for reference when resolving transaction disputes. Additionally, the transaction data can be used to automatically determine the net settlement amount for a casino property for a given settlement period, and the funds deposited electronically (e.g., via an ACH file) in lieu of depositing the physical instrument.

In this "checkless" embodiment the quasi-cash document is a non-negotiable instrument, such as a receipt, and cash advance transaction flow of funds proceeds as follows: (1) the customer initiates a Debit or Credit POS transaction via one of several possible systems, e.g., Kiosk, ATM or wireless device; (2) the customer receives authorization or denial from the selected system; (3) if authorized, the customer proceeds to the cashier's cage or central cage station and provides to a cashier identification and the credit/debit card used to initiate the transaction; alternatively, if the customer initiated the transaction on a wireless device, e.g. a remote control unit (RCU), the customer does not need to leave the gaming station where he is located, but rather the customer provides his identification and the credit/debit card to a cashier/attendant, or "runner," at the gaming station (the specific functionality of the RCU is further described below); (4) the cashier or attendant validates the customer's identity, retrieves the transaction information using the selected system or a cash advance application that is networked to and interfaces with the selected system, and completes the cash advance application; (5) the selected system or the cash advance application prints a transaction receipt; (6) the customer signs the receipt confirming the transaction took place (the customer's signature may be acquired on the physical receipt or it may be captured electronically through an electronic signature pad); (7) the receipt image is either physically stored or scanned and retained electronically and stored for subsequent transmittal to a central server (the central server may be maintained by the casino or a third-party facilitator that maintains the cash advance application); (8) the transaction information, including the receipt image if applicable, is recorded on the central server; and (9) the central server generates an ACH file containing all the cash advance transactions completed for a predetermined specified settlement period and electronically transmits the ACH file to the casino's designated financial institution for processing and successive posting of the deposits.

The "checkless" cash advance transaction has numerous advantages over existing systems. The casino benefits from the checkless transaction because all deposits are made electronically. The casino's financial institution typically receives funds for the current day's cash advance transactions within two business days. Additionally, the casino will not have the burden of physically depositing hardcopy drafts with the financial institution. Moreover, a casino that does not have a means to immediately transmit a paper document to the third-party facilitator or its financial institution can quickly transmit an ACH file electronically through various means (e.g., satellite from a cruise ship casino). The third-party facilitator benefits from the checkless transaction because research and retrieval of transaction receipts in the event of a cardholder dispute can be completed online with the option to display and print the electronic image of the signed customer receipt. There is no need for the third-party to managed or handle physical checks.

The system and method of the present invention provides a distinct improvement over previous configurations. In particular, the time requirements for performing a quasi-cash transaction (such as a cash advance transaction) are greatly minimized as necessary customer information need not be manually entered. In this regard, the system and method of the present invention preferably accounts for all formatting idiosyncrasies associated with the multitude of issued State identification cards. In one preferred embodiment, a customer database is automatically provided with customer identification information parsed from a State identification card.

As mentioned above, an alternative embodiment of a casino financial transaction system 210 in accordance with the present invention includes the use of wireless technology. As shown in block form in FIG. 7, the system 210 includes a portable remote control unit (RCU) 212, a base processor module 214, and a printer 216. In general terms, the system 210 is adapted for use within a casino 218 having at least one gaming station 220. The gaming station 220 can assume a wide variety of forms, including, for example, a gaming machine (e.g., slot machine, video poker, keno terminal, etc.) or a gaming table (e.g., black jack, poker, craps, roulette, etc.). Regardless, the RCU 212 is adapted to facilitate a financial card-type transaction (e.g., credit card, bank card, debit card, etc.), and is presented to a customer 222 otherwise located at the gaming station 220. Information relating to the desired financial transaction is entered into the RCU 212, that in turn signals the information to the base processor module 214 via wireless transmission. In one preferred embodiment, a terminal transceiver (not shown) is provided for receiving the wireless transmission. The base processor module 214, in turn, is operated to obtain approval for the desired financial transaction. Upon receiving approval for the desired transaction, the customer 222 enters his/her signature into the RCU 212 that in turn forwards an electronic copy of the customer's signature to the base processor module 214. The base processor module 214 then operates the printer 216 to print a negotiable financial document that includes the customer's signature. Finally, a financial instrument (e.g., chips, cash, check, etc.) is presented to the customer 222 at the gaming station 220. Thus, the entire financial transaction occurs without the customer 222 ever leaving the gaming station 220.

Figure 8A:
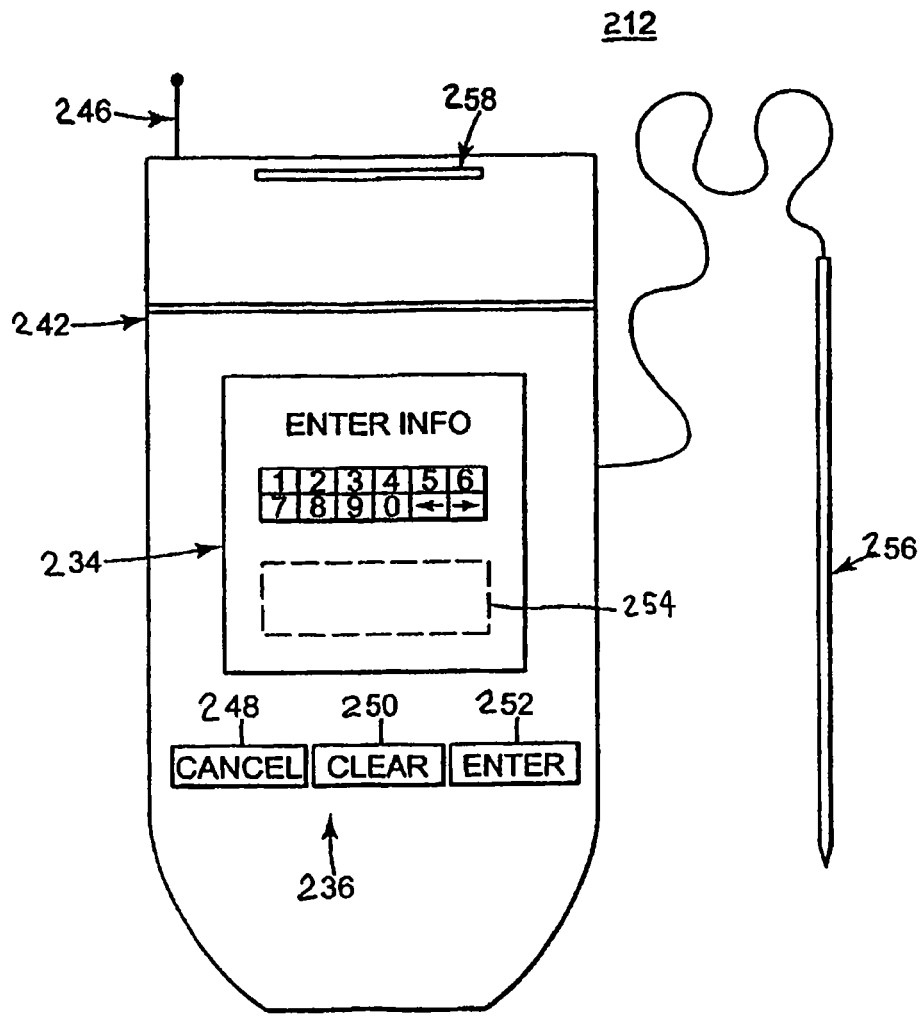
FIG. 8A is a simplified plan view of an embodiment of a portable remote control unit useful with the system of FIG. 7.
Figure 8B:
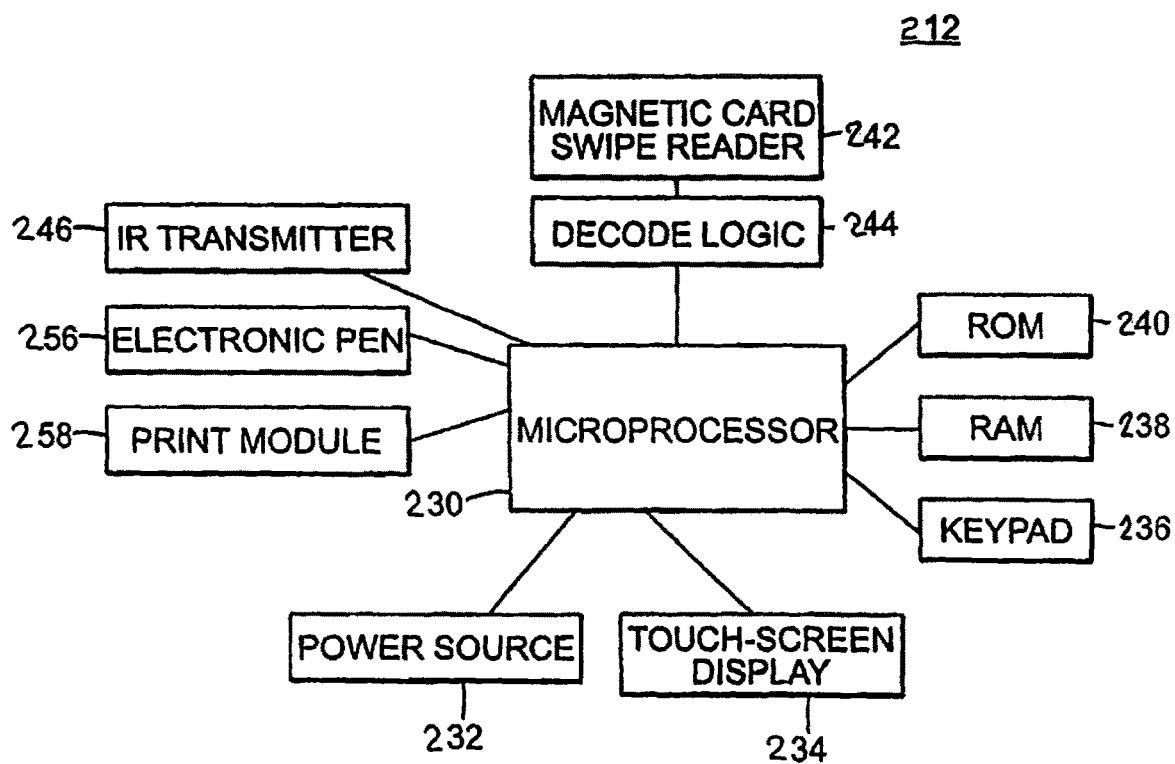
FIG. 8B is a block diagram of the portable remote control unit of FIG. 8A.

One embodiment of the portable RCU 212 is shown in greater detail in FIGS. 8A and 8B. As a point of reference, FIG. 8A provides a top plan view of the RCU 212, whereas the internal components are shown in block form in FIG. 8B. With this in mind, the RCU 212 preferably includes a microprocessor 230, a power source 232, a touch-screen display 234, a keypad 236, RAM 238, ROM 240, a magnetic card swipe reader 242, a decode logic module 244, and an IR transmitter 246. Construction and connection of the various components 230-246 are known in the art, and their interrelationship is described as follows.

Figure 7:
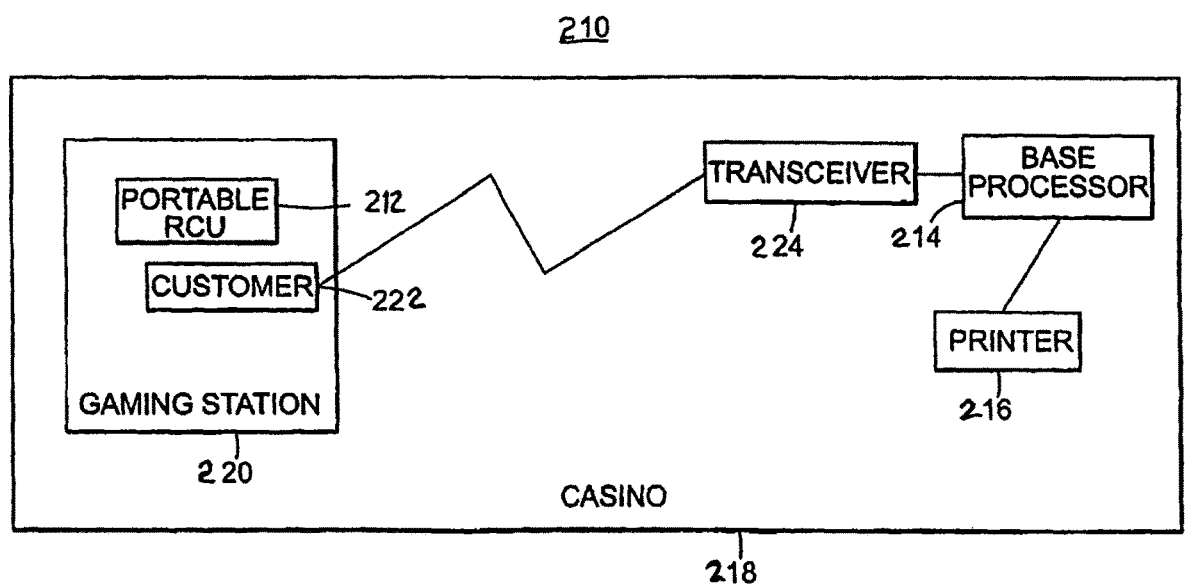
FIG. 7 is a block diagram of a wireless casino transaction system in accordance with an embodiment of the present invention.

The power source 232 is adapted to supply requisite power to other components of the portable RCU 212 (e.g., the microprocessor), and renders the RCU 212 truly portable. Thus, in one preferred embodiment, the power source 232 is a battery, although other types of self-contained power supply devices are acceptable. Alternatively, the RCU 212 can be adapted to be powered by a separate power supply provided within the casino 218 (FIG. 7).

The touch-screen display 234 and the keypad 236 provide a means for interaction between the customer 222 (FIG. 7) and the RCU 212. For example, the touch-screen display 234 can be operated to display various instructions and selection options to the customer 222 related to a desired financial transaction, with the displayed information/selections changing throughout a transaction operation. The keypad 236 preferably presents "standard" selection options to the customer 222, such as a "cancel" key 248, a "clear" key 250, and a "enter" key 252. The microprocessor 230 is adapted to perform a desired operation in response to depression of one of these keys 248-252. For example, pressing the "cancel" key 248 causes the microprocessor 230 to immediately end a particular transaction operation. The "clear" key 250 prompts the microprocessor 232 to clear previously entered information. Finally, the "enter" key 252 confirms that certain entered information is correct.

The touch-screen display 234 is further preferably formatted to provide a signature-capturing feature. In particular, the touch-screen display 234 in conjunction with the microprocessor 230 is preferably adapted to designate a signature box (shown generally at 254 in FIG. 8A) at a desired time during a financial transaction procedure within which the customer 222 can write his/her signature, such as via an electronic pen 256. The so-entered signature is electronically stored in an analog or digital format by the microprocessor 230 such as in the RAM 238. Alternatively, other techniques for electronically storing a signature can be incorporated into the RCU 212.

The software used to control operation of the microprocessor 230 is stored in the ROM 240. Conversely, information entered via the touch-screen display 234, the keypad 236, and/or the magnetic card swipe reader 242 is stored by the microprocessor 230 in the RAM 238 for further processing. In particular, the microprocessor 230 formats the data and signals information via the IR transmitter 246.

The magnetic card swipe reader 242 reads and decodes information on a magnetic stripe provided by a financial card and/or an identification card (not shown) otherwise swiped through the reader 242. The swipe reader 242 sends information to the decode logic module 244 that converts the serial bit stream from the reader 242 into a byte-wide stream for input to the microprocessor 230. Alternatively, other configurations for converting information provided by the financial card and/or identification card otherwise swiped (or dipped) through the reader 242 can be incorporated.

Finally, in one embodiment, the RCU 212 includes a printer module 258 that is otherwise connected to the microprocessor 230. As described in greater detail below, the microprocessor 230 is adapted to operate the printer module 258 to print a transaction receipt that in turn is provided to the customer 222 (FIG. 7) upon completion of a financial transaction.

In one preferred embodiment, the RCU 212 is a remote control unit available under the trade name "ICE 4000" from Hypercom Corp., of Phoenix, Ariz. Alternatively, other forms are equally acceptable.

Figure 9:
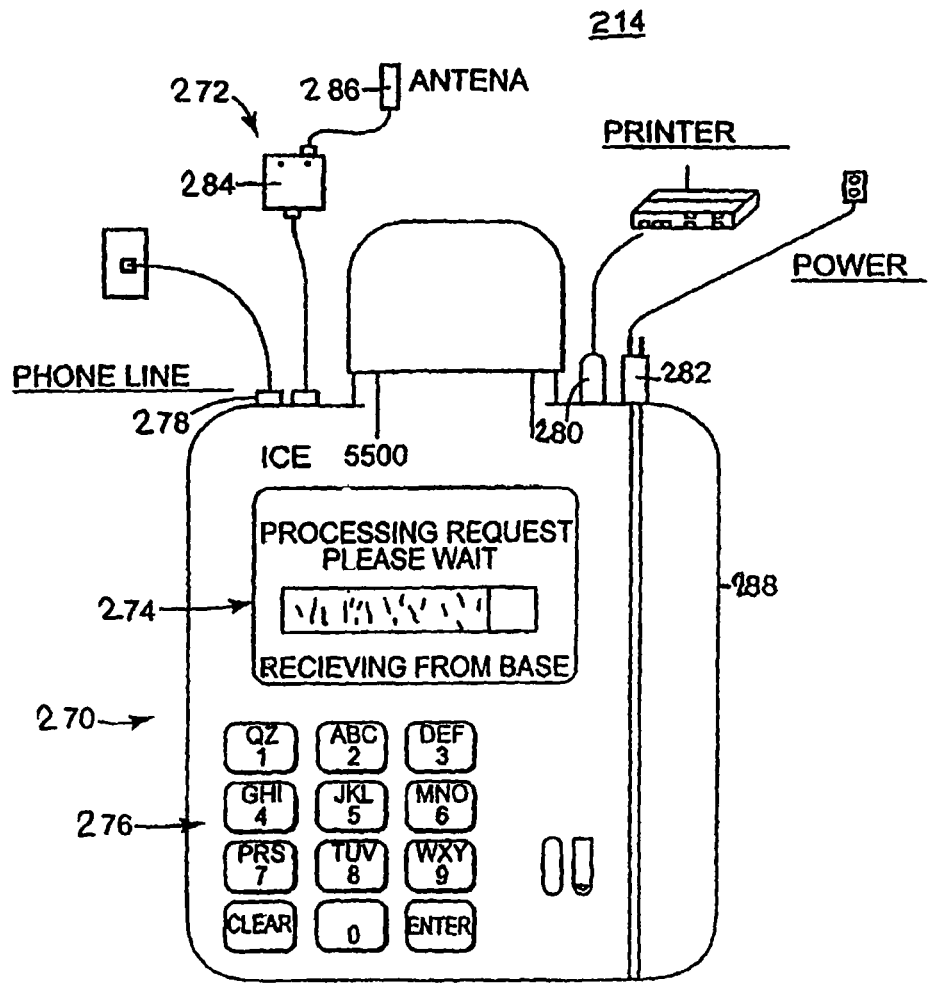
FIG. 9 is a simplified plan view of a base processor useful with the system of FIG. 7.

Further detail regarding the base processor module 214 is provided in FIG. 9. In this regard, the base processor module 214 preferably includes a base processor 270 and a wireless transmitting/receiving device 272. The base processor 270 is a microprocessor-based device, capable of storing information and performing desired operations. In one embodiment, the base processor 270 includes a display screen 274, a keypad 276, a phone line port 278, a printer port 280, and a power supply receptacle 282. In one preferred embodiment, the base processor 270 is a processor device available under the trade name "ICE 5500" from Hypercom Corp., of Phoenix, Ariz., although other configurations are equally acceptable. In a further preferred embodiment, the base processor 270 further includes, or has access to, a memory (not shown) in which customer information is stored in a designated database. As described below, this database can be periodically referenced to retrieve previously entered identification information for a repeat user of the system 210 (FIG. 7).

The display 274 is adapted to inform a user of a particular operational status, whereas the keypad 276 affords the ability to enter desired information.

The transmitting/receiving device 272 is adapted to transmit and receive wireless signaled information to and from the RCU 212 (FIG. 8A) for subsequent processing. In one embodiment, the transmitting/receiving device 272 includes a terminal transceiver 284 and an antenna 286. An appropriate terminal transceiver interface device is available from Hypercom Corp., of Phoenix, Ariz. Alternatively, the transmitting/receiving device 272 can be incorporated directly into a housing 288 otherwise provided by the base processor 270. Regardless, the transmitting/receiving device 272 is adapted to wirelessly transmit information to, and receive information from, the portable RCU 212.

Figure 10A:
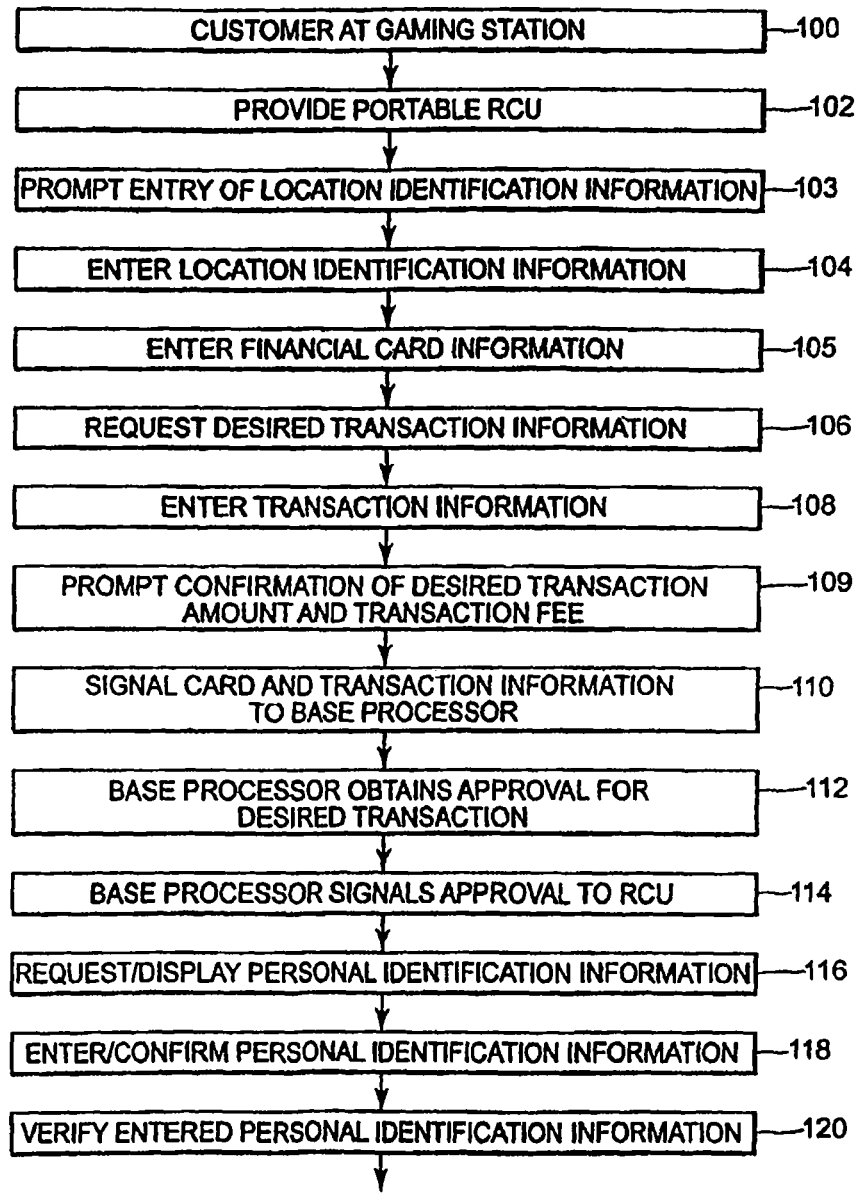
FIGS. 10A-10B is a flow diagram, illustrating one embodiment of a method of performing a casino financial transaction in accordance with the present invention.
Figure 10B:
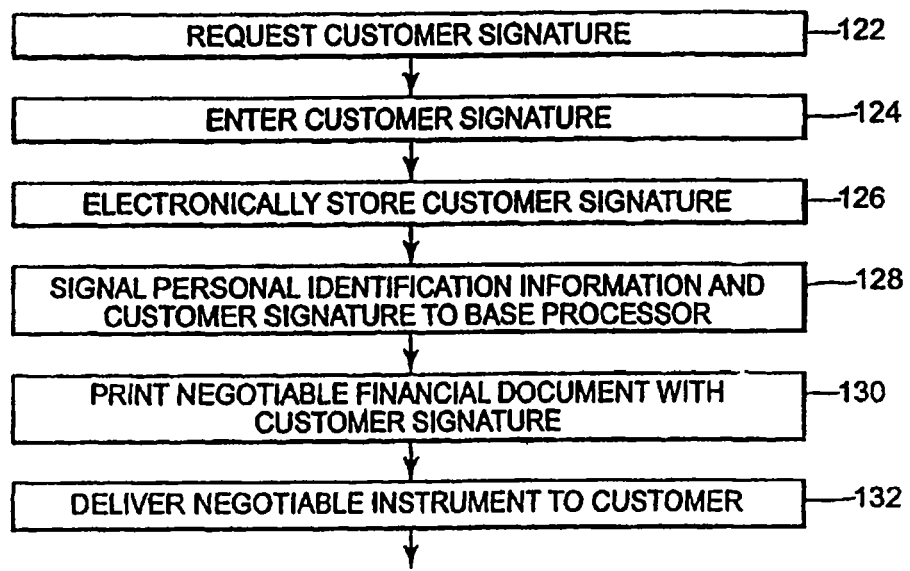

A preferred method of operating the system 210 in accordance with the present invention is provided in flow diagram form in FIGS. 10A and 10B. Beginning at step 100, the customer 222 is located at the gaming station 220 within the casino 218. Once again, the gaming station 220 can be one of many gaming activities typically found at a casino, such as a gaming machine (e.g., slot machine, a video poker machine, keno machine, etc.), or a gaming table (e.g., card table, roulette table, craps table, bingo table, etc.).

The customer 222 then desires to obtain cash or other negotiable instrument to continue playing at the gaming station 220. With this in mind, at step 102, the portable RCU 212 is provided to the customer 222 at the gaming station 220. For example, where the gaming station 220 is a card table, the portable RCU 212 can be located on the table itself, or can be stored within arm's reach of an attendant (e.g., dealer, pit boss, etc.) who then provides the portable RCU 212 to the customer 222. Alternatively, casino "runners" are normally dispersed throughout the casino 218 who constantly walk about the casino 218, and are available to assist customers. With this in mind, where the customer 222 is located at a discrete gaming station (e.g., slot machine, video poker, etc.), the runner or other casino personnel can hand deliver the portable RCU 212 to the customer 222. Regardless, the customer 222 is not required to exit or otherwise leave the gaming station 220 to access or interact with the portable RCU 212.

In one preferred embodiment, the RCU 212 then prompts the customer 222 (or casino attendant) to enter location identification information indicative of the particular casino location (or gaming station) at which the RCU 212 and the customer 222 are currently located at step 103. As described in greater detail below, documentation and/or a negotiable instrument may be delivered from a location of the base processor module 214 to the customer 222 upon completion of the financial transaction. To ensure that the document(s) and/or instrument is correctly delivered to the customer 222 (and not to a different customer using a separate RCU), an indication is preferably provided to the base processor module 214 (and thus a casino attendant otherwise responsible for delivering document(s)/instruments from the base processor module 214) of the casino location at which the financial transaction is being performed. The location identification information can assume a wide variety of forms, such as cashier number/designation, table number/designation, gaming machine number/designation, etc. Alternatively, the RCU 212 can be programmed to automatically provide pre-determined location identification information (e.g., where the RCU 212 is permanently located at a specific gaming table, the corresponding table number/designation information can be entered into, and saved by, the RCU 212). Where appropriate, the proper location identification information is entered at step 104. Alternatively, where identifying a specific location of the RCU 212 and/or the customer 222 is of little or no concern, steps 103 and 104 can be omitted.

The customer 222 enters information derived from a financial institution-issued card otherwise owned by the customer 222 at step 105. As is known, various financial institutions issue cards to their customers that include account information based upon which the customer can utilize to access funds otherwise maintained in that account. Examples of available financial institution cards include credit cards, debit cards, bank cards, etc. The account information can be manually entered by the customer 222 (and/or an attendant) via the touch-screen display 234, or by simply swiping (or dipping) the card through the magnetic card swipe reader 242 (FIG. 8A).

The RCU 212 then prompts the customer 222 to enter transaction information into the RCU 212 at step 106. In particular, the customer 222 is requested to enter a desired amount of the proposed financial transaction. At step 108, the customer 222 provides the transaction information to the RCU 212, such as by the touch-screen display 234.

In one preferred embodiment, the RCU 212 is adapted to determine a transaction fee to be paid by the customer 222 based upon the previously-entered desired amount (e.g., 7% of the desired amount). Alternatively, a predetermined "standard" transaction fee can be stored by the RCU 212 (e.g., $25). Regardless, the determined transaction fee is displayed to the customer in conjunction with the desired transaction amount at step 109, along with a request that the customer 222 confirm that the desired transaction amount is correct and that he or she agrees to pay the transaction fee (e.g., pressing a designated key on the RCU 212). Alternatively, the financial transaction of the present invention can be performed without a transaction fee.

The financial card information and transaction information (including the transaction fee where applicable) are signaled from the RCU 212 to the base processor module 214 via wireless transmission at step 110. In a preferred embodiment, the previously entered location identification information is also signaled from the RCU 212 to the base processor module 214, and in particular the transmitting/receiving device 272, at step 110. The base processor 270 is then operated to obtain approval for the desired financial transaction (including the transaction fee where applicable) from the financial institution that otherwise issued the particular financial card at step 112. For example, the base processor 270 can be connected (such as via a phone line) to a financial transaction processing service provider. Again, one such service provider is Vital Processing Services of Tempe, Ariz. In general terms, the requested transaction amount (including the transaction fee where applicable) is either authorized or denied by the service, with this decision then being provided to the base processor 270. The base processor 270, in turn, signals (via the transmitting/receiving device 272) the approval or denial of the transaction request to the portable RCU 212 at step 114.

Assuming the requested transaction amount (including the transaction fee where applicable) has been approved, the portable RCU 212 then prompts the customer 222, at step 116, to enter personal identification information, such as the customer's 222 name, address, zip code, etc. In one preferred embodiment, the base processor module 214 maintains a personal identification database. In the event the customer 222 has previously performed a financial transaction through the system 210 (as indicated, for example, by previously processing a financial institution card matching the financial card information previously provided at step 104), the base processor module 214 can signal saved personal identification information to the RCU 212 that in turn displays it to the customer 222. The customer 222 need only confirm the accuracy of the displayed information. Alternatively, the personal information is retrieved from a personal identification card, as outlined below. Regardless, at step 118, the requested information is entered (or confirmed or updated if necessary), either manually via the touch-screen 234 and/or the keypad 236, or by swiping an appropriate identification card (e.g., a driver's license formatted to include a magnetic strip). An attendant, at step 120, then verifies the entered information.

At step 122, the RCU 212 prompts the customer 222 to enter his/her signature into the RCU 212. The customer 222 personally provides this signature at step 124. Once again, the customer 222 can enter his/her signature into the RCU 212 in a variety of fashions, but is preferably accomplished via the electronic pen 256 and the designated box 258 provided on the touch-screen display 234. Regardless, at step 126, the RCU 212 electronically captures and stores the entered signature. The RCU 212 then signals the identification information and the electronically captured signature to the base processor module 214 via a wireless transmission, as previously described, at step 128.

With the relevant identification and electronically captured signature information in hand, the base processor 270 is operated, at step 130, to print a negotiable financial document via the attached printer 216. The negotiable financial document can assume a variety of forms, such as a check or money order, but will include the customer's 222 signature (reproducing in ink on the printed document the electronically captured signature). In one preferred embodiment, the printed negotiable document is a financial note issued by a providers of the system 210, that, when cashed by the casino, is drawn upon the system provider's bank account. With this approach, the customer's signature is necessary to satisfy draft completion requirements set forth by most, if not all, financial institutions that issue financial cards. Thus, the customer's signature ensures that the system provider (or other third party provider) will not be held liable in the event the customer 222 later disputes the transaction.

The printed negotiable financial document will have a negotiable monetary value equivalent to a value of the desired financial transaction. In one preferred embodiment, where the financial transaction includes a transaction fee, the negotiable financial document will have a monetary value equal to the desired amount, along with a notation that the financial transaction fee has been charged against the customer's 222 designated account, with this transaction fee having been transferred to a separate designated financial account (e.g., the provider of the system 210) by the base processor module 214. Notably, this type of financial transaction processing is normally carried out through an automated clearing house (ACH) as is known in the art. In a further preferred embodiment, the printed negotiable financial document includes the previously provided location identification information for reasons described below.

Regardless of the exact content, once printed, the casino 218 can process the negotiable financial document in accordance with its internal procedures. In one preferred embodiment, multiple copies of the negotiable financial document are printed, with only one of the printed documents be validly negotiable. For example, the document can be printed in triplicate, with two of the three versions being denoted as "non-negotiable". In any event, at step 132, a negotiable instrument is delivered to the customer 222 having a monetary value equal to the monetary value of the printed negotiable financial document. The negotiable instrument delivered to the customer can assume a variety of forms, and can include for example cash, chips, a separately prepared money order, or the previously printed financial document. Delivery of the negotiable instrument can take a variety of forms. For example, the attendant or runner (or other casino personnel) can review the approved information provided by the portable RCU 212 and provide the customer 222 with an amount of cash or chips equivalent to the approved amount or a casino-issued gaming card programmed to provide an account with the casino having a balance equivalent to the approved amount. Alternatively, an operator of the base processor module 214 can, after reviewing and processing the printed negotiable financial document, personally deliver, or direct another casino employee or other designee to deliver, chips, cash, or a casino-issued gaming card to the customer 222. In one preferred embodiment, the portable RCU 212 is further operated to print a transaction receipt that is given to the customer 222. In addition, or alternatively, a copy of the previously printed negotiable document is provided to the customer 222. In this regard, the location identification information, otherwise preferably printed on the document, provides a clear indication to the casino employee of where in the casino the document (and/or negotiable instrument) is to be delivered. This is especially useful in a casino having multiple RCUs 212 in operation.

Additionally, the RCU 212 is also capable of processing a checkless transaction as discussed above. In this embodiment, printed receipts are provided by RCU 212 at the completion of the transaction.

The system and method of the present invention provides a marked improvement over previous designs. In particular, casino customers are able to conveniently obtain additional monetary funds via an off-site financial institution account without ever having to leave the gaming station at which the customer is located. The all-to-common frustration of prematurely terminating a gaming activity is avoided and casinos are better able to keep a customer engaged in a gaming activity.

Although the present invention has been described with reference to preferred embodiments, workers skilled in the art will recognize that changes can be made in form and detail without departing from the spirit and scope of the present invention. For example, the identification card used could be any card deemed to be a reliable source of identification. Often, these include government issued cards such as driver's licenses, passports, etc. Additionally, while the system and method of the present invention has been described in the context of a casino, other environments are equally acceptable. The quasi-cash transaction can be performed in other locales, such as a racetrack, bingo parlor, nightclub, etc.

What is claimed is:

1. A method for making funds available for gaming, the method comprising:
  pre-authorizing a customer financial transaction comprising the steps of:
    reading customer information from a card associated with a financial account at an electronic processing terminal;
    allowing the customer to select a quasi-cash transaction at the electronic processing terminal, the quasi-cash transaction creating a negotiable instrument which represents an amount of money; and
    providing authorization information to said customer of whether said financial transaction is authorized or denied;
  and
  upon said transaction being authorized and an identity of the customer being verified, completing the customer financial transaction via an electronic unit separate from said terminal, comprising the steps of:
    generating said negotiable instrument comprising at least some of the customer information read from said card, the negotiable instrument representing an amount of money;

receiving an electronic signature for the generated negotiable instrument from the customer via input to said electronic unit;

associating said signature with an image of said negotiable instrument to create an endorsed negotiable instrument;

storing said endorsed negotiable instrument as an electronic image at an image repository; and allowing said customer to access funds based upon said endorsed negotiable instrument.

2. The method of claim 1, wherein the step of receiving said electronic signature comprises receiving input from the customer with a stylus to an electronic display of said electronic unit.

3. The method of claim 1, further comprising a step of printing out a transaction receipt for said quasi-cash transaction.

4. The method of claim 1, wherein the electronic unit comprises a wireless control unit.

5. The method of claim 1, wherein the card associated with a financial account is a debit or a credit card.

6. The method of claim 5, wherein the step of reading customer information comprises reading information regarding a customer source of funds associated with the financial account from the debit or credit card.

7. The method of claim 1, further comprising a step of receiving information regarding the identity of the customer.

8. The method of claim 7, wherein the identity information is obtained from a personal identification card provided by the customer.

9. The method of claim 1, wherein said negotiable instrument is issued against funds associated with said financial account, which funds are used to repay money obtained based upon said negotiable instrument.

10. The method of claim 1, wherein said electronic unit is located at a cage station and said identity of said customer is verified by an attendant at said cage station.

11. The method of claim 1, further comprising said electronic unit retrieving information associated with said authorization from said terminal.

12. The method of claim 1, wherein said funds accessed by said customer comprise one or more casino chips.

13. The method of claim 1, further comprising generating an ACH file for use in settling said negotiable instrument with a financial institution.

14. A system for making funds available for gaming comprising:

an electronic processing terminal which is configured to read customer information from a card associated with a financial account, receive input from the customer of the selection of a quasi-cash transaction, the quasi-cash transaction creating a negotiable instrument which represents an amount of money, and provide authorization information to said customer of whether said financial transaction is authorized or denied;

and an electronic unit separate from said terminal, said electronic unit configured to, upon said transaction being authorized and an identity of the customer being is verified, complete the customer financial transaction by:

retrieving authorization information for said financial transaction;

generating said negotiable instrument comprising at least some of the customer information read from said card, the negotiable instrument representing an amount of money;

receiving an electronic signature for the generated negotiable instrument from the customer via input to said electronic unit;

associating said signature with an image of said negotiable instrument to create an endorsed negotiable instrument; and transmitting an image of said endorsed negotiable instrument to an image repository.

15. The system of claim 14, wherein the electronic unit comprises a wireless control unit.

16. The system of claim 14, wherein said electronic unit is configured to receive said electronic signature via a stylus to an electronic display of said electronic unit.

17. The system of claim 14, wherein said electronic processing terminal is configured to communicate with a financial transaction processing system to attempt to authenticate said financial transaction.

18. The system of claim 14, wherein said image repository is associated with a server.

19. The system of claim 14, further comprising a central server, said central server comprising said image repository and configured to generate an electronic ACH file and transmitting said ACH file to a financial institution for processing of said negotiable instrument.

20. The system of claim 14, wherein said electronic unit is located at a casino cage.

* * * * *